United States Patent [19]
Barzynski et al.

[11] Patent Number: 4,788,562
[45] Date of Patent: Nov. 29, 1988

[54] OPTICAL RECORDING MEDIUM

[75] Inventors: Helmut Barzynski, Bad Duerkheim; Herbert Naarmann, Wattenheim, both of Fed. Rep. of Germany

[73] Assignee: BASF Aktiengesellschaft, Fed. Rep. of Germany

[21] Appl. No.: 3,707

[22] Filed: Jan. 15, 1987

[30] Foreign Application Priority Data

Jan. 16, 1986 [DE] Fed. Rep. of Germany ....... 3601067

[51] Int. Cl.$^4$ ...................... G01D 9/00; G01D 15/10; H01M 4/60
[52] U.S. Cl. ................. 346/135.1; 429/213; 346/76 L
[58] Field of Search .......................... 346/135.1, 76 L; 429/213

[56] References Cited

U.S. PATENT DOCUMENTS

| 4,097,895 | 6/1978 | Spong. | |
|---|---|---|---|
| 4,219,826 | 8/1980 | Bloom et al. . | |
| 4,241,355 | 12/1980 | Bloom et al. . | |
| 4,375,427 | 3/1983 | Miller | 429/213 |
| 4,710,899 | 12/1987 | Young et al. | 346/135.1 |
| 4,711,830 | 12/1987 | Haruta et al. | 430/52 |

Primary Examiner—E. A. Goldberg
Assistant Examiner—Mark Reinhart
Attorney, Agent, or Firm—Keil & Weinkauf

[57] ABSTRACT

In an optical recording medium of the reflection type, the light-absorbing layer contains polypyrrole as the light-absorbing substance.

2 Claims, No Drawings

OPTICAL RECORDING MEDIUM

The present invention relates to an optical recording medium of the reflection type, consisting of a light-absorbing layer applied on a base and on a light-reflecting layer.

The possiblity of recording information, particularly for image and data storage, by optical methods has recently been investigated thoroughly. In particular, the unusually high recording densities achievable by these methods make such a storage medium appear particularly interesting. In the conventional systems, a signal is recorded by focussing a laser beam of appropriate frequency and adequate intensity on the recording medium, with the result that a permanent change is produced in the recording layer. To record a sequence of signals, the write laser is appropriately modulated and the laser beam and recording medium are moved relative to one another. This produces a sequence of optically detectable images. These stored signal images are read by means of a laser beam of constant intensity which is not sufficient to alter the layer, the reflected part of the laser beam being determined. The signal image present in the recording medium produces a corresponding change in the reflectance, which is proportional to the stored information. This principle of information storage and retrieval has long been known and is described in a number of publications.

U.S. Pat. No. 40 97 895 describes recording media having a recording material capable of being stripped off. Here, a light-reflecting material, such as an aluminum or gold layer, is covered with a light-absorbing layer such as fluorescein. If a focussed, intensity-modulated laser beam, e.g. an argon or helium/cadmium laser, is directed towards the record-ing material, the light-absorbing material is vaporized or stripped off and a hole is produced, exposing the light-reflecting layer. The thickness of the light-absorbing layer is chosen so that the component has minimum reflectivity. After the recording procedure, there is maximum contrast between the minimum reflectance of the light-absorbing layer and the reflectance of the light-reflecting layer. In this way, the reflection/absorption pattern can be formed in the recording medium. When the light-reflecting material is provided as a thin layer on a nonconductive substrate, the energy absorbed from the light beam is concentrated in a very thin layer because the energy loss both as a result of reflection at the thin absorption layer and as a result of transmission through the reflecting layer is small. The recording sensitivity of a recording medium of this type is therefore surprisingly high.

Although the known system operates satisfactorily as such, a disadvantage which has to be accepted is that the argon and helium/cadmium lasers used are bulky components whose operation requires considerable electric energy. Moreover, an external light modulator is required. However, it is desirable to have the possi- blity of operating with low energy demand; this would be possible if solid-state injection lasers, e.g. aluminum gallium arsenide lasers, were used. Lasers of this type emit light in the range from 750 to 850 nm.

DE-A-29 51 340 and DE-A-29 51 341 describe optical recording media which absorb in the wavelength range of the radiation of these semiconductor lasers. For this purpose, phthalocyanine dyes are applied to the light-reflecting layer by a conventional reduced-pressure vaporization method. The said layer must be applied in the form of a thin layer of optical quality, so that light is absorbed at the frequency of the laser beam used, and in this procedure smooth holes are formed through stripping of the absorption layer or by fusion. The disadvantage of the optical recording layer described is the increased graininess of the light-absorbing layer, this graininess being due to the vapor deposition process and resulting in a low signal-to-noise ratio.

It is an object of the present invention to provide absorption materials for the stated optical recording media, which materials absorb in the wavelength range of conventional semiconductor lasers and can be applied in a uniformly thin and smooth layer such that the conventional recording technique gives a recorded image having a signal-to-noise ratio of not less than 40 dB.

We have found that this object is achieved, and that optical recording media essentially consisting of a light-absorbing layer applied on a base and on a light-reflecting layer have the required properties, if the light-absorbing layer contains polypyrrole as the light-absorbing substance.

Polypyrrole absorbs light in the entire visible spectral range, so that any conventional laser may be used for recording. The pyrrole polymers used are in the form of particles having an essentially spherical shape. The have a mean particle diameter of from 0.01 to 0.3 $\mu$m. Larger particles would give an excessively poor signal-to-noise ratio, while smaller particles would give layers having light absorption characteristics which are disadvantageous for semiconductor lasers.

The compounds from the class consisting of the pyrroles which are useful for the preparation of the suitable polymers are pyrrole itself as well as the substituted pyrroles, i.e. the N-alkylpyrroles, the N-arylpyrroles, the pyrroles which are monosubstituted or disubstituted by alkyl on the carbon atoms, and those which are monosubstituted or disubstituted by halogen on the carbon atoms. Pyrrole can be used alone or as a mixture with other compounds from the class consisting of the pyrroles. Unsubstituted pyrrole itself is preferably used. Where substituted pyrroles are employed, 3,4-dialkylpyrroles, in particular those in which alkyl is of 1 to 4 carbon atoms, and 3,4-dihalopyrroles, in particular 3,4-dichloropyrrole, are preferred. If necessary, small amounts, for example from 0.1 to 10 moles per mole of pyrrole, of other heterocyclic compounds which contain a conjugated $\pi$-electron system, such as furan, thiophene or thiazole, may be concomitantly used.

To prepare the finely divided pyrrole polymers, the compounds from the class consisting of the pyrroles are treated in solution with an oxygen-containing oxidizing agent. Advantageously, from 0.2 to 10 moles of the oxidizing agent are used per mole of pyrrole or of a mixture of pyrroles with one another or with other compounds copolymerizable with pyrroles. If less than 1 mole is used, it is found that some of the starting substance employed is not converted to the polymer. It is not necessary to use larger amounts of oxidizing agents since the amount is sufficient to convert the total amount of starting materials to polymer. An excess over and above the stated amount is unnecessary in most cases but may have specific effects from time to time. Among the oxygen-containing oxidizing agents, peroxo acids and their salts and peroxodisulfuric acid and its alkali metal and ammonium salts have proven particularly useful. Peroxoborates or peroxochromates, such as sodium perborate or potassium dichromate, are also preferably used. Permanganates, such as potassium permanganate, are also suitable if small amounts of acids are added to these permanganates. Hydrogen superoxide is also preferably used, the presence of conductive salts being essential in this case. Organic peroxides, such as benzoyl or lauroyl peroxide, as well as peresters, eg. perpivalates, etc., are also useful. Where organic solvents are employed, soluble perchlorates, eg. iron perchlorate, are also suitable.

The finely divided pyrrole polymers are prepared in solution, water having proven a suitable solvent, if necessary as a mixture with organic, water-miscible solvents. However, it is also possible to use organic solvents such dimethyl sulfoxide, methylene chloride, methanol, ethanol, acetonitrile, sulfolane, ethylene carbonate, propylene carbonate, dioxane or tetrahydrofuran. Advantageously, the solutions contain from 0.1 to 50, preferably from 1 to 5, % by weight of the pyrrole or of a mixture of pyrroles with one another or with other compounds. The amount of oxidizing agent to be added is based on the abovementioned principle. The reaction can advantageously be carried out at from 0° to 100° C., preferably from 15° to 40° C. Satisfactory results are generally obtained when the reaction is effected at room temperature.

The finely divided polymers obtained are applied, preferably together with a polymeric binder, in a thin layer on the substrate. The layer thickness is from 0.02 to 1.0 pm and the polypyrrole/binder ratio ranges from 10:1 to 1:10.

Suitable polymeric binders are homopolymers and copolymers of (meth)acrylates, polyvinyl compounds, soluble polycarbonates, polystyrene, soluble cellulose derivatives, polyolefins, and the like.

In a further embodiment, the light-absorbing layer characteristic of the novel optical recording medium can be prepared by depositing the polypyrrole directly onto the reflector, for example electrochemically. Furthermore, the solvent used is water, to which organic solvents, such as alcohol or water-soluble ketones, and conductive salts are added. Suitable conductive salts are $KHSO_4$, $Na_2SO_4$, $KBF_4$ and $LiClO_4$, and acids such as $HClO_4$, $HClOOH$, $H_2SO_4$, $HNO_3$ and $H_3PO_4$ are also suitable conductive substances.

With regard to the other components, the novel optical recording media conform to the prior art. Usually, the recording layer is present on a base. A substrate of this type should have an optically smooth, flat surface. Sheets or disks of glass or plastic are generally used for this purpose. The light-reflecting layer is present on this substrate, the said layer reflecting the light used for recording and reading. Suitable materials are aluminum, rhodium, gold and the like. The thickness of this reflecting layer must be such that the said layer can reflect the incident light. This thickness is usually from 5 to 100 nm. If the light-reflecting material can be converted to a self-supporting, optically smooth layer, the base may be dispensed with.

The light-absorbing layer characteristic of the novel optical recording medium is then applied onto the light-reflecting layer in the stated manner. In an advantageous embodiment, it may be advisable to produce an intermediate layer between the reflecting layer and the absorbing layer; it is also possible to apply the conventional cover sheet and/or protective layer onto the light-absorbing layer.

The experiments which follow illustrate the invention by way of example.

EXAMPLE 1

A 0.1 μm thick polypyrrole layer was deposited anodically, from a solution of 25 g pyrrole and 0.1 g of $Na_2SO_4$ in 500 ml of water and 500 g of ethanol, onto a glass sheet plated with gold by the vapor deposition. The current density was 0.03 $mA/cm^2$. Using the focussed beam of a 25 mW He/Ne laser ($\lambda=633$ nm) and of an 8 mW Ga/As semiconductor laser, it was possible to inscribe holes of 0.6 μm diameter in the absorbing layer.

EXAMPLE 2

1.5 g of pyrrole were added dropwise, in the course of one hour, to a stirred solution of 5 g of a copolymer of 70% by weight of methyl methacrylate and 30% by weight of methacrylic acid, having a K value of 40, 45 g of dicyclohexyl peroxydicarbonate and 0.2 g of trichloroacetic acid in 100 g of ethanol. During this procedure, the solution became green and then black. Immediately thereafter, the solution was applied to an acrylic glass sheet in a photoresist whirler coater. The sheet was stored overnight at 80° C. The resulting uniform, grayish-green layer was 0.5 μm thick. The extinction at 830 nm was 0.8.

Using the focussed beam of an 8 mW Ga/As semiconductor laser ($\lambda=830$ nm), it was possible to burn holes having a diameter of 0.8 μm into the layer. The sensitivity was about 1 nJ per hole.

We claim:

1. An optical recording medium consisting essentially of, a base, a light-reflecting layer on said base, and a light-absorbing layer on said base and reflecting layer, said light-absorbing layer containing polypyrrole as the light-absorbing substance.

2. An optical recording medium as set forth in claim 1, wherein the polypyrrole is in the form of particles having an essentially spherical shape and a mean particle diameter of from 0.01 to 0.3 μm.

* * * * *